(12) United States Patent
Motozawa et al.

(10) Patent No.: US 6,851,505 B2
(45) Date of Patent: Feb. 8, 2005

(54) OCCUPANT PROTECTIVE APPARATUS

(75) Inventors: Yasuki Motozawa, Saitama (JP); Kazuya Yoshida, Saitama (JP)

(73) Assignee: Hondo Giken Kogyo Kabushiki Kaisha, Tokyo (JP)

( * ) Notice: Subject to any disclaimer, the term of this patent is extended or adjusted under 35 U.S.C. 154(b) by 20 days.

(21) Appl. No.: 09/733,384

(22) Filed: Dec. 6, 2000

(65) Prior Publication Data

US 2001/0037908 A1 Nov. 8, 2001

(30) Foreign Application Priority Data

Dec. 6, 1999 (JP) ................................ P. 11-346019

(51) Int. Cl.[7] ................................................ B60K 5/12
(52) U.S. Cl. .................. 180/274; 296/65.01; 296/68.1; 297/216.1; 297/216.15
(58) Field of Search ................................ 180/274, 271, 180/282; 297/216.1, 216.15; 296/65.01, 68.1, 65.1

(56) References Cited

U.S. PATENT DOCUMENTS

| | | | | |
|---|---|---|---|---|
| 3,917,339 A | | 11/1975 | Fritz ........................ | 296/65 A |
| 4,795,189 A | * | 1/1989 | Vollmer et al. ............. | 180/274 |
| 5,076,389 A | | 12/1991 | Goor ......................... | 180/232 |
| 5,154,253 A | * | 10/1992 | Vollmer ...................... | 180/274 |
| 5,518,271 A | | 5/1996 | Bell ........................... | 280/806 |
| 6,186,574 B1 | * | 2/2001 | Motozawa et al. ........ | 296/68.1 |
| 6,193,296 B1 | * | 2/2001 | Motozawa et al. ........ | 296/68.1 |
| 6,312,038 B1 | * | 11/2001 | Kawamura et al. ........ | 296/68.1 |
| 6,394,535 B1 | * | 5/2002 | Kawamura et al. ........ | 296/68.1 |

FOREIGN PATENT DOCUMENTS

| | | | | |
|---|---|---|---|---|
| CA | 636693 | * | 2/1962 | ............ 297/216.1 |
| DE | 1680095 | * | 10/1970 | ............ 296/65.01 |
| DE | 197 11 392 C1 | | 10/1998 | |
| EP | 0 860 349 A2 A3 | | 8/1998 | |
| FR | 1 012 718 | | 7/1952 | |
| JP | 7-101354 | | 4/1995 | |

* cited by examiner

*Primary Examiner*—Eric Culbreth
(74) *Attorney, Agent, or Firm*—MacPherson Kwok Chen & Heid LLP; David S. Park

(57) ABSTRACT

The present occupant protective apparatus includes a vehicle body in which a portion to be deformed on receiving a collision load (in the illustrated embodiment, the front side frames) is formed at least in front of a vehicle room (3), a structure made of a rigid body supported on the vehicle body in such a manner that it is movable backward on receiving the collision load (in the illustrated embodiment, the engine 6), seats (8) each including a seat belt (9) for constraining an occupant seated on the seat (8) and supported on the vehicle body so as to be movable in the back-and-forth direction of the vehicle body, and a power transmission mechanism for transmitting the backward movement of the structure to thereby move the seats (8) backward (in the illustrated embodiment, the cable 13). With use of the present occupant protective apparatus, the structure such as the engine is allowed to move backward as soon as a vehicle collision occurs and, with the backward movement of the structure, the seats can be moved backward. Due to this, in the early stage of the vehicle collision, in the seats and seat belts, there is generated deceleration which is higher than the deceleration of the passenger room of the vehicle body, thereby being able to enhance the occupant constraining forces that are given by the seat belts.

8 Claims, 5 Drawing Sheets

OCCUPANT PROTECTIVE APPARATUS

BACKGROUND OF THE INVENTION

The present invention relates to an occupant protective apparatus for use in a vehicle and, in particular, to an occupant id protective apparatus which is capable of reducing deceleration applied to an occupant when the vehicle collides.

Recently, in order to enhance the effect of occupant cu protection in a vehicle collision, there have been proposed various vehicle body structures in which the deforming mode of go the other remaining portions of a vehicle body than the passenger room of the vehicle body in a vehicle collision is set properly to thereby be able not only to reduce the deceleration of the passenger room of the vehicle body but also to prevent the deformation of the remaining portions of the vehicle body from extending over the passenger room of the vehicle body (see Japanese Patent Unexamined Publication No. Hei.7-101354).

On the other hand, the deceleration of the occupant constrained to a seat by a seat belt can firstly start at the time when a forwardly going inertial force acting on the occupant in the vehicle collision is received by the seat belt. Here, since the spring action of the seat belt cannot be removed completely, the inertial force causes the occupant to move forward and the deceleration of the occupant reaches its peak value at the time when the extension of the seat belt reaches its limit. It is generally said that the peak of the occupant deceleration increases as the moving amount of the occupant due to the inertial force increases and, normally, the peak of the occupant deceleration becomes higher than the average deceleration of the passenger room of the vehicle body. Therefore, in order to reduce an impact to be given against the occupant due to the vehicle collision, the deceleration of the vehicle body must be adjusted in such a manner that a delay in the starting time of the occupant deceleration with respect to the vehicle body deceleration can be minimized.

However, it is substantially impossible to connect the occupant to the vehicle body as an integral unit and, especially, in the case of a compact vehicle in which it is difficult to secure a sufficient stroke in the other remaining portions of the vehicle body than the passenger room thereof, it is difficult to reduce the occupant deceleration further simply using a conventional occupant protecting method in which the deceleration of the passenger room in a vehicle collision is reduced by properly setting the deforming stress of the vehicle body.

SUMMARY OF THE INVENTION

The present invention aims at eliminating the drawbacks found in the above-mentioned conventional occupant protective apparatus. Accordingly, it is an object of the invention to provide an occupant protective apparatus which can reduce not only the size of the vehicle body but also the deceleration of the occupant at a further higher dimension.

In attaining the above object, according to the invention, there is provided an occupant protective apparatus which comprises: a vehicle body in which a portion to be deformed on receiving a collision load (in the illustrated embodiment, the front side frames) is formed at least in front of a vehicle room (3); a structure made of a rigid body supported on the vehicle body in such a manner that it is movable backward on receiving the collision load (in the illustrated embodiment, an engine 6); seats (8) each including a seat belt (9) for constraining an occupant seated on the seat (8) and supported on the vehicle body so as to be movable in the back-and-forth direction of the vehicle body; and a power transmission mechanism for transmitting the backward movement of the structure to the seats (8) to thereby move the seats (8) backward (in the illustrated embodiment, a cable 13).

With use of the present occupant protective apparatus, the structure such as the engine is allowed to move back as soon as a vehicle collision occurs and, with the backward movement of the structure, the seats can also be moved back. Due to this, in the early stage of the vehicle collision, in the seats and seat belts, there is generated deceleration which is higher than the deceleration of the passenger room of the vehicle body, thereby being able to enhance the occupant constraining forces that are given by the seat belts.

Especially, in the case where the present occupant protective apparatus further includes a limit specifying mechanism for specifying the limit of the backward movement of the seats (in the illustrated embodiment, stoppers 16), with a proper time delay after the vehicle collision, there can be generated in the seat a deceleration which goes in the opposite direction to the deceleration caused by the vehicle collision, that is, an acceleration. This acceleration cancels the relative speed between the occupant and the vehicle body to thereby be able to make an inertial force constant instantaneously, so that the deceleration of the vehicle body and the deceleration of the occupant can be made equal to each other in the early stage of the vehicle collision.

DETAILED DESCRIPTION OF THE PREFERRED EMBODIMENTS

Now, description will be given below in detail of the invention with reference to an embodiment of an occupant protective apparatus according to the invention shown in the accompanying drawings.

Figure 1:
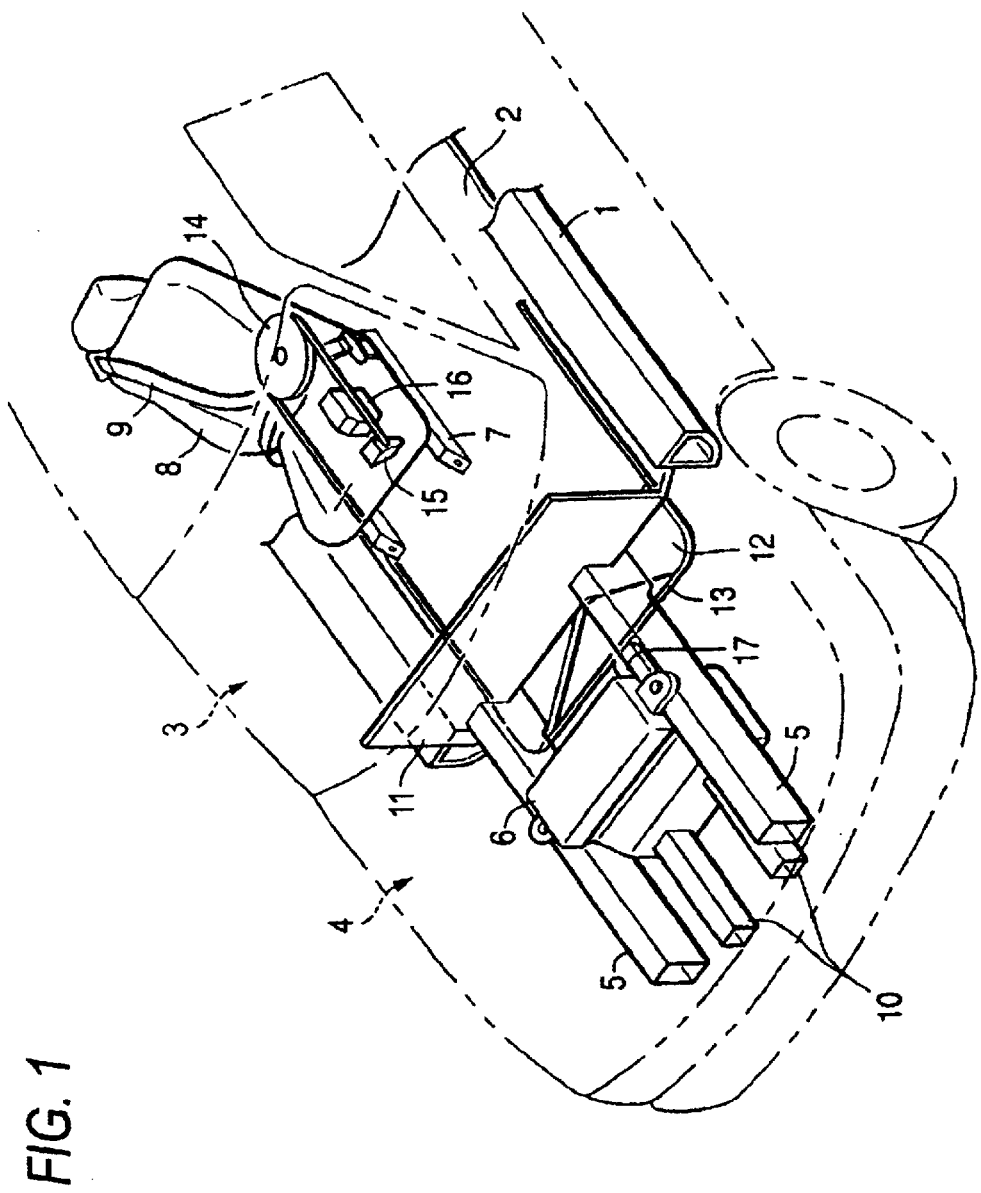
FIG. 1 is a schematic structure view of a vehicle body to which the invention is applied.
Figure 2:
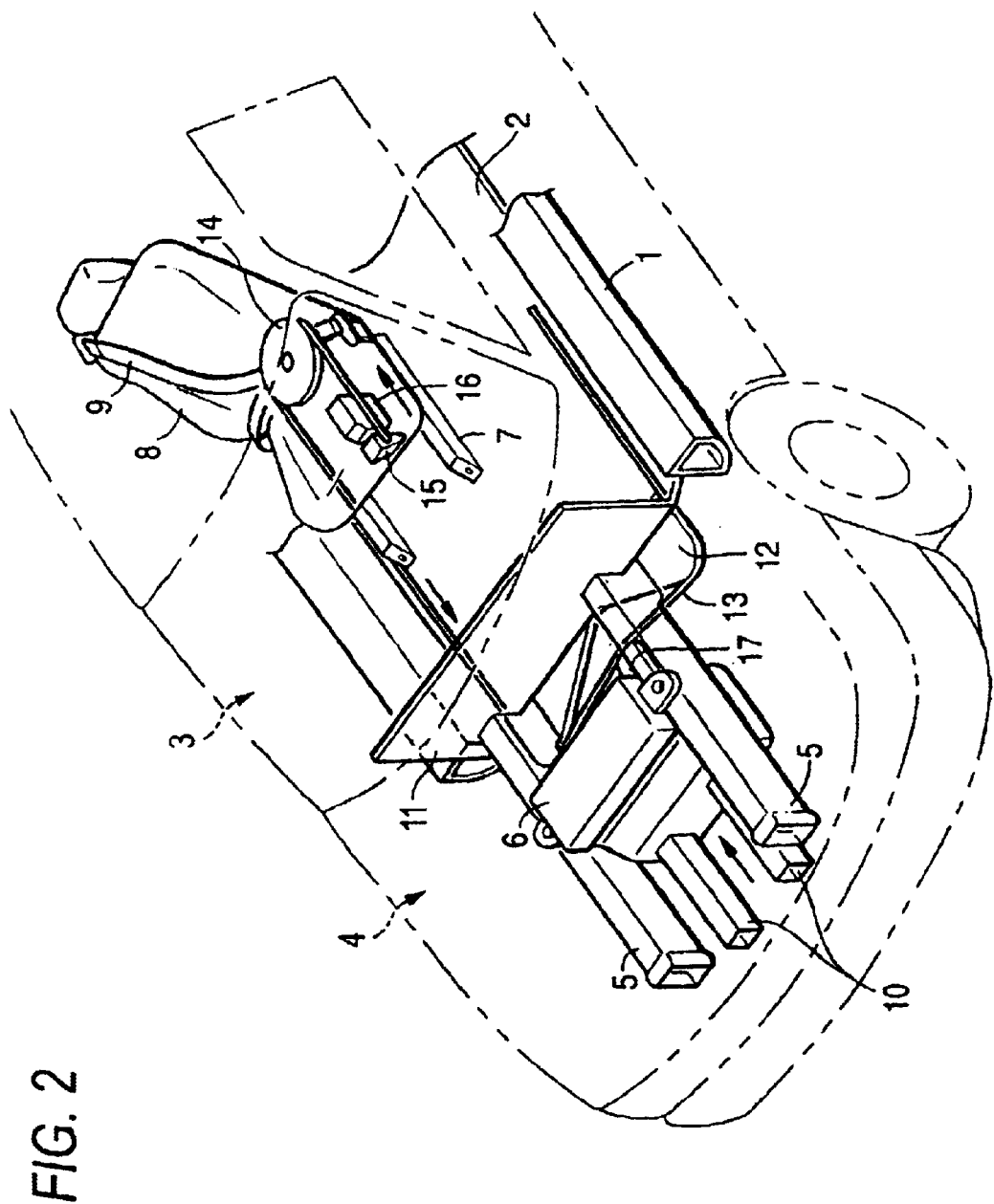
FIG. 2 is a schematic structure view of the above vehicle body, showing a state thereof in the early stage of a vehicle collision.
Figure 3:
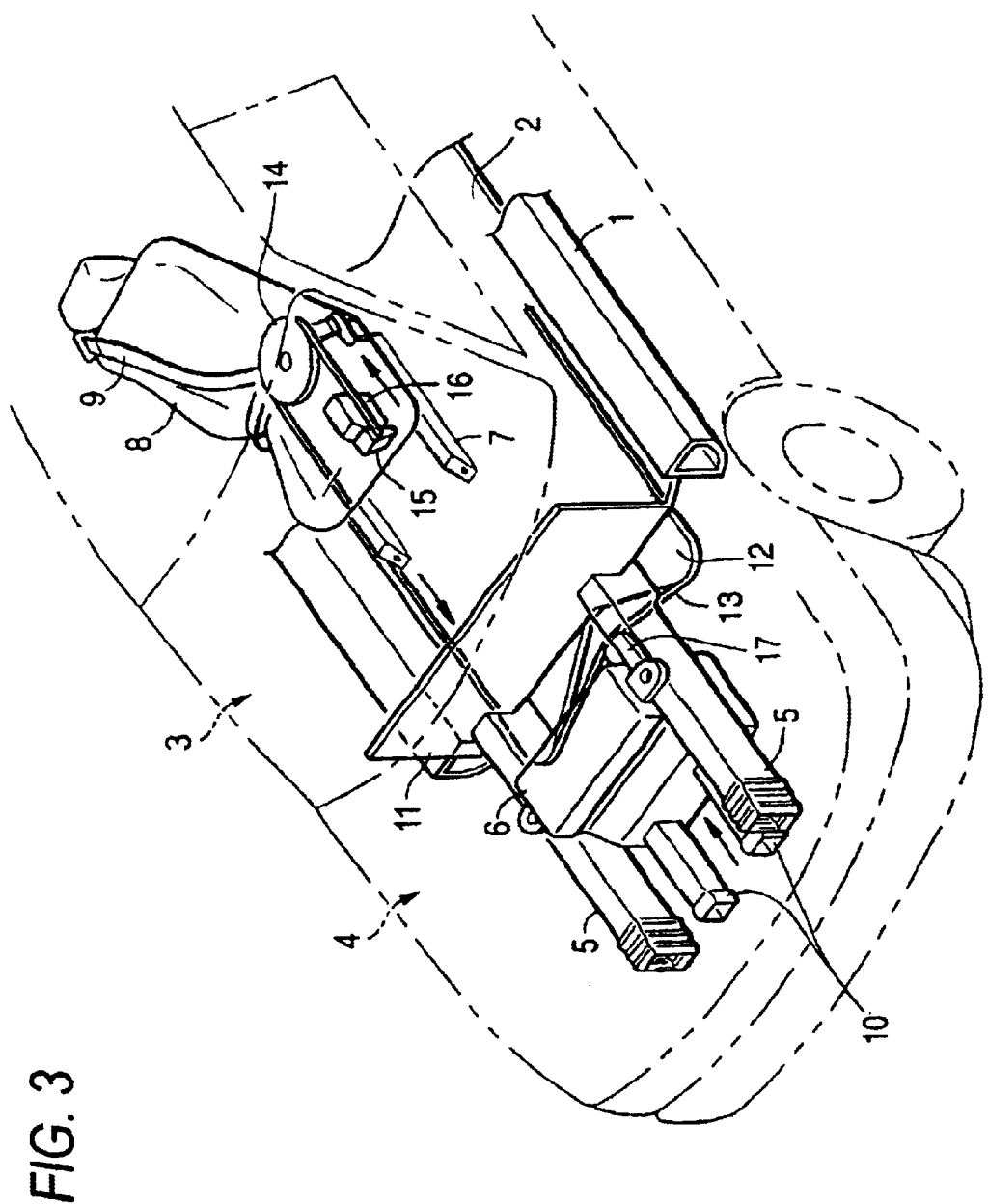
FIG. 3 is a schematic structure view of the above vehicle body, showing a state thereof in the middle stage of the vehicle collision.
Figure 4:
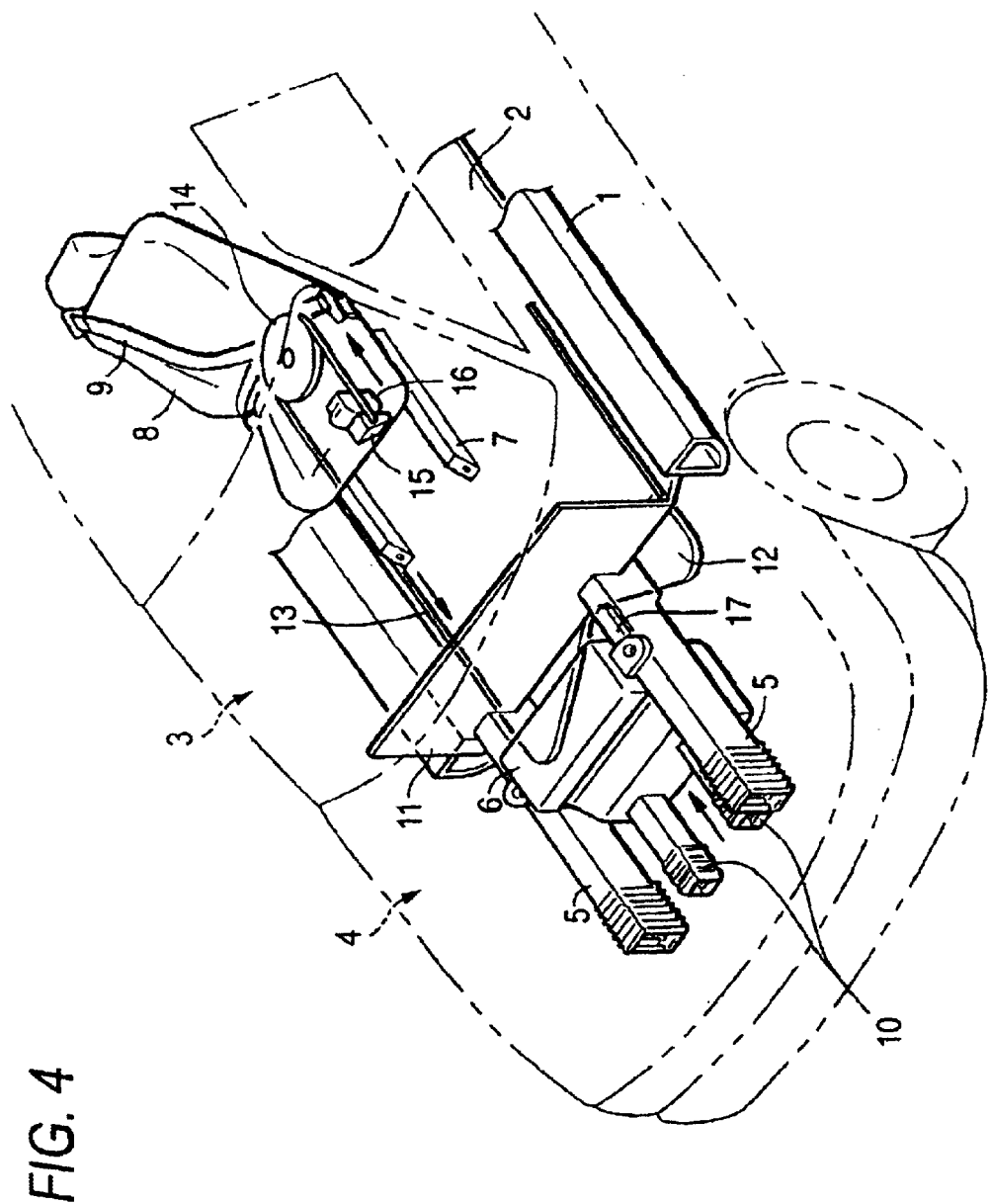
FIG. 4 is a schematic structure view of the above vehicle body, showing a state thereof in the late stage of the vehicle collision; and, FIG. 5 is a view of the waveform of deceleration in a vehicle collision.
Figure 5:
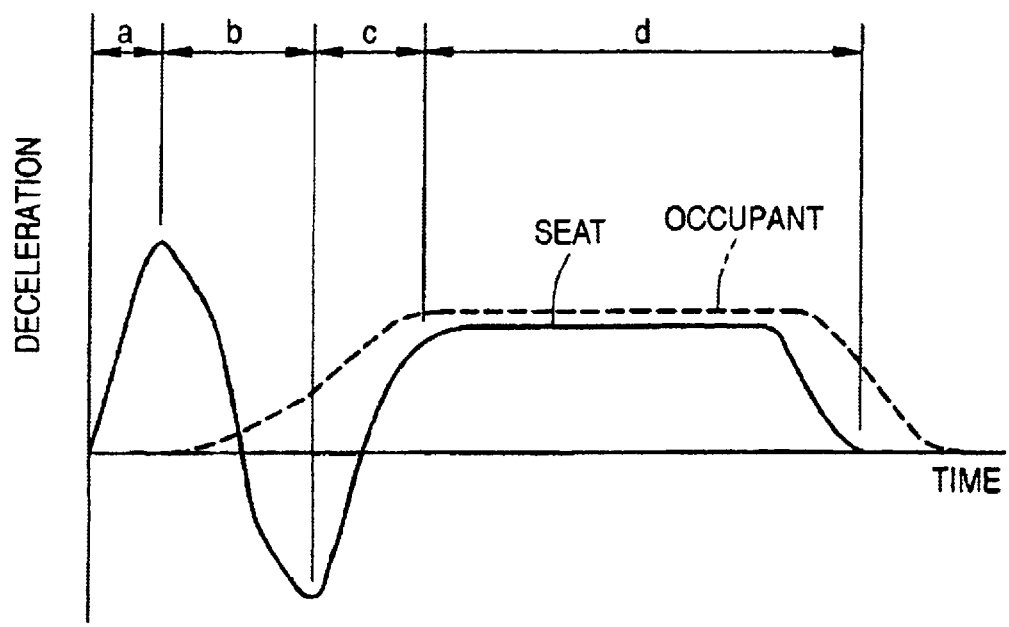

FIG. 1 is a conceptual perspective view of the main portions (n of a vehicle body structure to which the invention is applied. This vehicle body structure comprises a vehicle room chamber 3 which is composed of a side sill 1 and a floor 2; a pair of front side frames 5 which are respectively disposed within an engine room 4 so as to extend in the back-and-forth direction of the vehicle body and are connected to the floor 2 as an integral unit; an engine 6 which is connected to the front side frames 5 in such a manner that, in case where a force of a given value or more is applied thereto, it can be slided backward; and, two right and left front seats 8 (in FIG. 1, only one of them is shown) which are installed on the floor 2 through guide rails 7 in such a manner that they can be moved in the back-and-forth direction of the vehicle body. By the way, each seat 8 includes a seat belt 9 for constraining the motion of an occupant (not shown).

On the front surface of the engine 6, there is disposed a collision load transmission member 10 which can be compressed and deformed on receiving an impact load in a vehicle collision to reach a plane substantially the same as the front end faces of the front side frames 5 having a function to reduce t) deceleration acting on the vehicle room 3. This collision load ad transmission member 10 may be connected directly to the engine 6 or may be supported by some suitable mechanism at a position which is slightly spaced from the front surface of the engine On the front surface of a dashboard 11, which separates the engine room 4 from the vehicle room 3, there is fixed a cable guide 12 which has an M shape when viewed from its upper surface. On and between the highest points of the right and left ridges of the cable guide 12, there is provided a cable 13. The cable 13 is structured in the following manner: the two ends of the cable 13 are respectively drawn into the vehicle room 3, are turned back around a guide 14 fixed in the rear of the right and left seats 8 and, after that, are connected to their associated cable connecting metal members 15 which are respectively fixed to the lower surfaces of the seats 8.

At a position which is opposed to the rear surface of each cable connecting metal member 15, there is disposed a stopper 16 which is used to define the limit of the backward movement of the seat 8. By the way, preferably, this stopper 16 may include shock absorbing mechanism such as a honeycomb structure.

To the rear surface of the engine 6, there is connected a projecting portion 17 in such a manner that it can be contacted with the intermediate portion of the cable 13 extending over the go valley portion of the M-shaped cable guide 12.

Next, description will be given below of the operation of the above-mentioned occupant protective apparatus of the invention with reference to FIGS. 2 to 5, assuming a case in which the vehicle collides head on with a structure on the road.

As soon as the vehicle head-on collision occurs, the front portions of the front side frames 5 receive the impact loads and thus start to buckle and deform. And, since the mass of the engine 6 is small with respect to deforming stresses caused in the front side frames 5 and the buckling strength of the collision load transmission member 10 disposed on the front surface of the engine 6 is higher than the front side frames 5, the front side frames 5 continue their forward movements because the front ends thereof are deformed, whereas the engine 6 seemingly moves backward with respect to the vehicle body (see FIG. 2).

In case where the engine 6 moves backward, the projecting portion 17 of the rear surface of the engine 6 is pressed against the intermediate portion of the cable 13 extending over the cable guide 12, so that a tensile force is applied to the portion of the cable 13 that extends into the vehicle room 3, thereby causing the seat 8 to move backward. Due to this, the seat 8 and seat belt 9 are allowed to decelerate earlier than the vehicle room 3 with suddenly rising large deceleration (in FIG. 5, an area shown by a).

In this state, the occupant seated on the seat 8 is going to continue his/her forward movement due to the inertial force thereof.

However, since the seat 8 moves backward instantaneously with respect to the floor 2, the constraining force of the seat belt 9 applied to the occupant is caused to increase, thereby preventing the occupant from moving forward.

In the middle stage of the vehicle collision, the engine 6, to which large deceleration is being applied because the collision load transmission member 10 is pressed against the engine 6, moves further backward with respect to the front side frame 5 which still continues to deform. With the further backward movement of the engine 6, the seat 8 also moves further backward with respect to the floor 2, so that the cable connecting metal member 15 is brought into contact with the stopper 16 fixed below the seat 8 (see FIG. 3).

Due to the contact of the member 15, the inertial force of the vehicle room 3 portion is transmitted to the seat 8 through the cable connecting metal member 15, so that the seat 8 continues its relative movement with respect to the floor 2 until the deformation of the shock absorbing mechanism of the stopper 16 is ended and thus the relative speed between the floor 2 and seat 8 reaches zero. Therefore, acceleration going in the vehicle advancing direction in the vehicle collision is applied to the seat 8 and seat belt 9, thereby making constant a forward inertial force which is acting on the occupant (in FIG. 5, an area shown by b).

In the late stage of the vehicle collision, the backward movement of the seat 8 reaches its limit to thereby stop the backward movement of the engine 6, as soon as the deforming stress of the collision load transmission member 10 is added to the deforming stresses of the front side frames 5. Then, the deceleration increases again (in FIG. 5, an area shown by c) and, after that, the vehicle room 3 and seats 8 decelerate together as an integral unit (see FIG. 4). Thereafter, the relative speed between the vehicle room 3, seats 8, and seat belts 9 becomes zero through the above process, and the constraining loads of the seat belts 9 balance well with the deceleration in the late stage of the vehicle collision. Therefore, the occupant is allowed to decelerate together with the vehicle room 3 as an integral unit, and the decelerating state continues until the vehicle body stops perfectly (in FIG. 5, an area shown by d).

Now, to reduce the impact that the occupant receives in the vehicle collision, firstly, it is important to reduce the deceleration of the occupant as much as possible. In view of this, as described before, in the case of the deceleration waveform (shown by a solid line in FIG. 5) in which, in the early stage of the vehicle collision, there is generated in the seat 8 a higher deceleration than the average vehicle body deceleration for a short period of time. Next, there is generated in the seat 8 the oppositely going deceleration (that is, an acceleration) for a short period of time and, after that, the seat 8 decelerates with the average vehicle body deceleration, as shown by the broken line in FIG. 5, the deceleration of the occupant can be controlled down to a low level, when compared with a vehicle which does not incorporate therein an occupant protective apparatus according to the present embodiment.

To enhance the above-mentioned effects of the invention, it preferably, the strength of the front side frames 5 and collision load transmission member 10, the elastic characteristics of the seat belts 9, the shock absorbing characteristics of the stoppers 16, and the moving amount of the engine 6 may be set properly such that, at the time when the relative speed between the vehicle room 3 and seats 8, seat belts 9 becomes zero, the relative speed between the occupant and vehicle room 3 approaches zero as much as possible, and the constraining loads of the seat belts 9 can balance well with the deceleration of the vehicle room 3 and seats 8 in the late stage of the vehicle collision.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

As has been described heretofore, according to the invention, in the early stage of the vehicle collision, only in the seats and seat belts, there is generated the higher deceleration than the average deceleration of the vehicle body to thereby strengthen the constraining force of the seat belt with respect to the occupant going to move forward as soon as is the vehicle collision occurs and, next, the backward movement of the seat is constrained to thereby generate in the seats and seat belts the acceleration that goes in the opposite direction to the above deceleration so as to cancel the forward going occupant inertial force, whereby, in the late stage of the vehicle collision, the deceleration of the vehicle body can be made equal to the deceleration of the seat and occupant. Therefore, according to the invention, it is possible to generate in the seat and seat belt a deceleration waveform which is preferable for reduction of the occupant deceleration, so that the peak value of the occupant deceleration can be reduced greatly with a small deforming amount of the vehicle body when compared with the conventional occupant protective apparatus.

Also, since the moving amount of the occupant within the vehicle room with respect to the vehicle body can be reduced, there can be reduced the possibility of a secondary collision in which the occupant can be butted against a structure within the vehicle room and can be thereby damaged.

What is claimed is:

1. An occupant protective apparatus, comprising:
   a vehicle body including a portion to be deformed on receiving a collision load and a separate member for transmitting said collision load, said portion being formed at least in front of a vehicle room wherein the separate member is deformable after said portion is deformed to thereby allow for control over deceleration of said vehicle room on receiving said collision load;
   an engine made of a rigid body supported on said vehicle body, wherein said engine is attached to said separate member so as to be movable together backward relative to said vehicle body on receiving said collision load;
   a seat supported on said vehicle body so as to be movable in the back-and-forth direction of said vehicle body, said seat including a seat belt for constraining an occupant seated on said seat;
   a power transmission mechanism transmitting the backward movement of said engine to said seat, to thereby move said seat backward, wherein the power transmission mechanism is a cable; and
   a guide fixed to the vehicle body, around which the cable is drawn back, one end of said cable affixed to said seat.

2. The occupant protective apparatus as set forth in claim 1, further comprising a limit specifying mechanism for specifying the limit of said backward movement of said seat.

3. The occupant protective apparatus as set forth in claim 2, wherein said limit specifying mechanism is a damping stopper.

4. An occupant protective apparatus, comprising:
   a vehicle body including an engine supported on a deformable portion of said vehicle body, wherein said engine is attached to a member for transmitting a collision load wherein said member is deformable after said portion is deformed to thereby allow said engine to be capable of backward movement together toward an occupant compartment in an event of a front-end collision;
   a seat in said occupant compartment, supported on rails so as to be movable in the back-and-forth direction;
   a cable disposed between the engine and the occupant compartment, and affixed to the seat, so as to transmit the backward motion of the engine to the seat to thereby move the seat backward in the event of a front-end collision; and
   a guide fixed to the vehicle body, around which the cable is drawn back, one end of said cable affixed to said seat.

5. The occupant protective apparatus as set forth in claim 4, wherein said seat further comprises a seat belt for constraining an occupant seated on said seat.

6. The occupant protective apparatus as set forth in claim 4, wherein the cable is attached to said seat by means of a connecting metal member which is fixed to a lower surface of said seat.

7. The occupant protective apparatus as set forth in claim 4, further comprising a limit specifying mechanism for specifying the limit of said backward movement of said seat.

8. The occupant protective apparatus as set forth in claim 7, wherein said limit specifying mechanism is a damping stopper.

* * * * *